United States Patent [19]

Engdahl et al.

[11] Patent Number: 5,144,598
[45] Date of Patent: Sep. 1, 1992

[54] INTERGRATING, INDICATING, AND CONTROLLING SEISMOMETER

[75] Inventors: Paul D. Engdahl, 3101 Fairview, Space 133, Santa Ana, Calif. 92704; Roland S. McGee, Tujunga; Roger P. Engdahl, Costa Mesa, both of Calif.

[73] Assignee: Paul D. Engdahl, Costa Mesa, Calif.

[21] Appl. No.: 682,973

[22] Filed: Apr. 10, 1991

[51] Int. Cl.$^5$ .......................................... H04R 19/00
[52] U.S. Cl. .................................. 367/181; 367/188; 181/122; 73/654
[58] Field of Search ................ 181/122; 73/651–654; 346/7, 33 C; 367/178, 181, 182, 188

[56] References Cited

U.S. PATENT DOCUMENTS

| | | | |
|---|---|---|---|
| 3,740,757 | 6/1973 | Engdahl | 346/7 |
| 4,223,319 | 9/1980 | Engdahl | 346/7 |
| 4,630,483 | 12/1986 | Engdahl | 73/652 |
| 5,069,071 | 12/1991 | McBrien | 73/654 |

*Primary Examiner*—Brian S. Steinberger
*Attorney, Agent, or Firm*—Lawrence Fleming

[57] ABSTRACT

A seismometer system which provides readouts of the time integral (Cumulative Absolute Velocity or CAV) of the acceleration time history of an earthquake. CAV is found to be a measure of the structural damage potential of an earthquake. Three triaxial low frequency acceleration sensors are connected into a digital computer system. Each sensor has a capacitive pickoff, whose capacitances determines the length of an electrical pulse; the pulse gates high-frequency clock cycles into a counter. The counts are summed to give the time integral. A microprocessor provides for periodic re-zeroing and other calibration functions, and for the actuation of alarms, relays and electrical pulses for utility shutoff and the like at predetermined levels of CAV. The acceleration time history of the earthquake is stored in the memory for later retrieval if desired. The whole system is contained in a small inexpensive package.

17 Claims, 4 Drawing Sheets

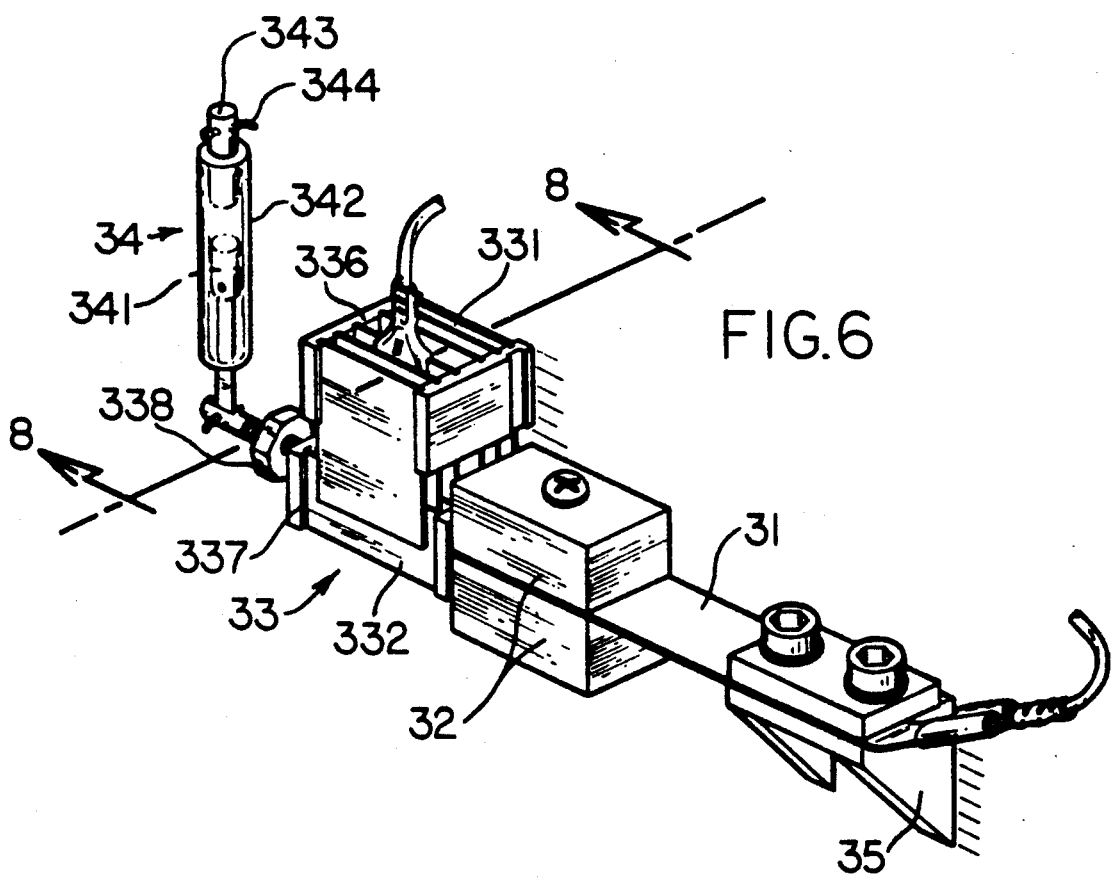
FIG.6
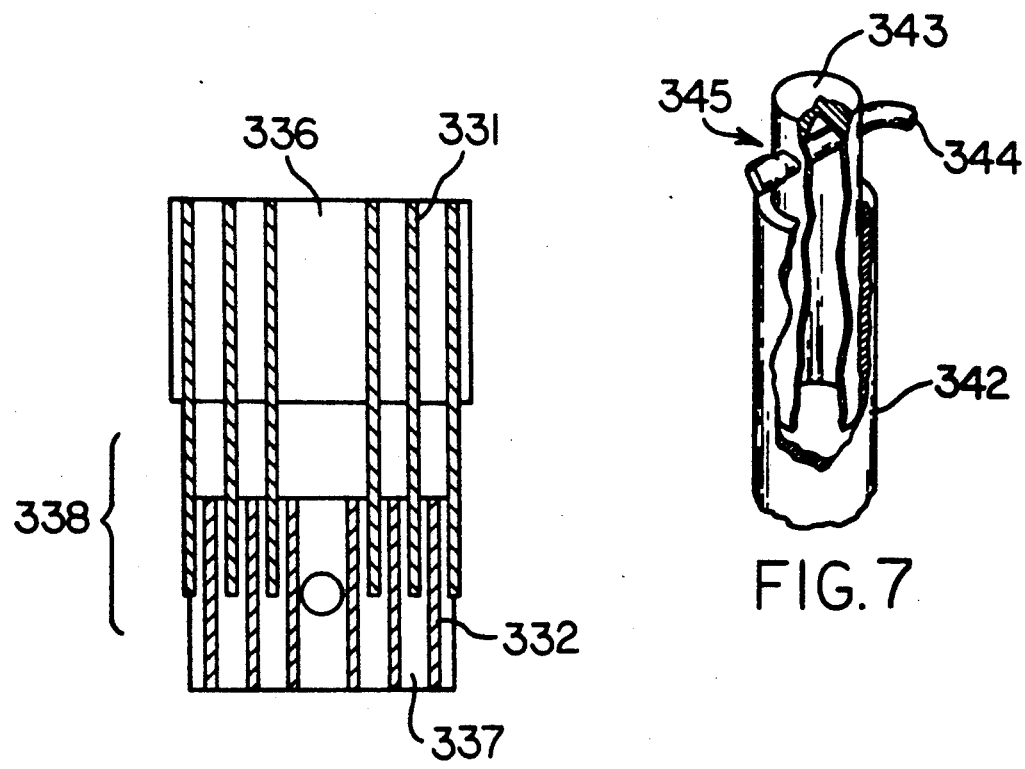
FIG.8
FIG.7

INTERGRATING, INDICATING, AND CONTROLLING SEISMOMETER

FIELD OF THE INVENTION

This invention relates to seismic instruments for measuring the intensity of earthquakes. It further relates to the electrical processing of ground acceleration data by integration with respect to time to yield and display Cumulative Absolute (ground) Velocities (CAV), which have been found to be related to the degree of damage to structures. The invention also relates to protective devices to, e.g., close gas valves in response to such ground velocities exceeding preselected values.

BACKGROUND OF THE INVENTION: FIELD

The last thirty years has seen rather widespread installation of strong-motion accelerographs in tall buildings, oil refineries, power plants, dams, and other critical structures. Many records of earthquake ground motion from these and other installed instruments became available. Numerous such records have been analyzed and compared with the actual damage caused by the earthquakes —a procedure known as post-event analysis.

Several rules of interpretation have been established and applied to such post-event analysis. For example, a study funded by electric utility companies and conducted by the Electric Power Research Institute (EPRI) compared seismic data and damage effects for over 260 earthquakes. One of the findings was that ground accelerations at frequencies below 10 Hertz had significantly greater damage potential than at higher frequencies. It was further found that the duration of an event (earthquake) was an essential factor in assessing damage potential. EPRI then concluded that a computed quantity called Cumulative Absolute Velocity (CAV) provided the most significant determinant of earthquake damage potential. CAV is determined by summing the accelerations in both directions in the frequency range 0-10 Hz and multiplying them by their duration in seconds, which is equivalent to the area under the acceleration vs. time curve. CAV is expressed in g-seconds, where g is the acceleration of gravity. It may be noted that CAV is so called because it has the dimensions of length divided by time, or velocity. Typical values of CAV may range from around 0.1 to 5.

For certain applications it is convenient to provide scales of earthquake damage potential based on CAV but over different frequency ranges and having generally larger numerical values, to avoid confusion with the existing Richter and Mercalli scales. These may be called Engdahl scales, or ES. An Engdahl scale is defined as the CAV multiplied by 100, where the acceleration data have been filtered through a specified low-pass filter before being integrated against time. At present there are four Engdahl scales, which differ only in the filtered frequency band. They are:

| ES (L) | Low band | 0-4 Hz |
|---|---|---|
| ES (M) | Medium band | 0-12.7 Hz |
| ES (H) | High Band | 0-40.4 Hz |
| ES (V) | Very High Band | 0-128 Hz. |

The L and M scales relate primarily to structural damage from earthquake ground motion. The H and V scales relate mainly to damage caused by blasts, where forces are applied very suddenly.

A rough comparison may be made between the Engdahl scales and the Richter and the Modified Mercalli scales. The Richter scale is a geophysical scale that expresses logarithmically the total amount of energy released in the whole region of an earthquake. Ground motion at any given point, however, varies with the nature of the underlying strata and the location and depth of the focus (epicenter) of the quake. The Modified Mercalli (MM) scale is a qualitative expression of the structural damage and social effects of an earthquake at a given location. A portion of the MM scale is summarized below:

MMI IV: Felt indoors by many, awakened a few. Some rattling of windows or creaking of walls.

MMI V: Felt by most; slight excitement, frightened a few. Some broken dishes.

MMI VI: Felt by all; frightened many; excitement general; some alarmed. Damage slight; some broken windows.

MMI VII: General alarm; damage moderate in many ordinary buildings, considerable damage in poorly built buildings and old walls; many fallen chimneys.

MMI VIII: Alarm approaches panic. Considerable damage in some ordinary buildings, many fallen walls, chimneys, towers; some tumbled wooden houses.

MMI IX: Panic general. Cracked ground conspicuous. Damage considerable in some buildings specially designed for earthquakes. Damaged reservoirs and underground pipes.

Although the methods of gathering and interpreting data differ, an approximate equivalency chart is shown below:

TABLE I

| Engdahl Scale | Modified Mercalli | Richter Magnitude |
|---|---|---|
| 5-11 | IV | 4.0-4.5 |
| 11-23 | V | 4.5-5.0 |
| 23-48 | VI | 5.0-5.5 |
| 48-98 | VII | 5.5-6.0 |
| 98-200 | VIII | 6.0-6.5 |
| 200-410 | IX | 6.5-7.0 |

It will be apparent that an instrument that determines CAV or Engdahl intensities immediately at the time of an earthquake may: (1) furnish data in a single number for correlation with structural damage, and (2) operate to energize alarm devices and to automatically shut down critical apparatus or machinery, as, closing gas valves or shutting down pumps.

SUMMARY OF THE INVENTION

The principal basic components of an instrument according to the invention are:

1. Three similar sensors disposed to sense accelerations in mutually perpendicular directions. The directions are conveniently called Vertical (V), North-South (N-S), and East-West (E-W). That is, a triaxial accelerometer.

2. Electronic signal processing and computing means to do the following:

(a) Integrate the accelerometer data with respect to time;

(b) Discard data below a preselected acceleration level;

(c) Filter the accelerometer data to pass frequencies below a preselected value, e.g. to pass 0–4 Hz;

(d) Display the integrated data numerically and continuously;

(e) Periodically re-zero the integrator to prevent the accumulation of irrelevant data, as from the instrument becoming slightly tilted;

(f) Provide an alarm signal and relay closure when the integrated data (cumulative velocity) exceeds a predetermined value; and optionally, a electrical output signal capable of closing a suitable gas valve or initiating shutdown of critical machinery.

(g) Provide storage of data for future access.

A preferred kind of acceleration sensor is a reed-and-mass sensor of the general sort shown in my prior U.S. Pat. No. 3,740,757 at 7, FIGS. 1, 3, 5, 7 and 10. For damping, an air dashpot is preferred, of the general type shown in my prior U.S. Pat. Nos. 4,223,319 in FIGS. 7–9, and 4,630,483 at 30 in FIGS. 1 and 5. The present air dashpot has some novel improvements over these.

Three such sensors are mounted triaxially in known style; examples are shown in my prior U.S. Pat. Nos. 3,974,504 in FIG. 8, and 4,630,483 at FIG. 5.

In such sensors the free ends of the cantilever-spring-like reeds are displaced substantially proportionally to the acceleration imparted to their base or fixed ends in the direction normal to the plane of the reed.

The link or pickoff between such a sensor and the electronics may be any known type of displacement transducer (such as a differential transformer), but a variable capacitor has particular and novel advantages, and is preferred, when the electronic system is digital. Other types of transducers generally deliver analog electrical output signals and so require analog-to-digital converters. A capacitive transducer, however, requires none; its capacitance may, by simple means, be translated directly into an analogous number of clock pulses. This capacitive transducer or pickoff comprises two mutually displaceable sets of conductive plates.

A stationery set of several small spaced capacitor plates is attached to the base or frame of the instrument. A movable set of generally similar plates is attached to the proof mass at the free end of the reed. The two sets of plates mesh or interleave but do not touch; the degree of meshing and hence the capacitance varies with the position of the proof mass, i.e., with the acceleration imparted to the base.

In the electronics, each of the three variable capacitors is preferably connected in known manner as the timing capacitor in a timer, such as a monostable multivibrator (herein called an MMV) which upon receipt of a "START" signal generates a pulse whose length is substantially proportional to the capacitance.

The MMV pulse gates a clock signal into a counter, which counts clock pulses during the duration of the MMV pulse, which duration is a gating interval. The number of clock pulses collected by the counter during this gating interval is then a function of the acceleration imparted to the base of the instrument.

The total of the counts over a period of many MMV pulses represents the time integral of the accelerations.

The capacitance being small, the MMV or timer pulses are short. Hence to get good time resolution a high clock rate is employed, such as 20 mHz.

The electronic portion of the invention includes timers, displays (preferably LCD), display drivers, gates, memories and a microprocessor employed in known manner.

Power is normally supplied from a commercial outlet; rechargable batteries float across the d-c supply and will power the instrument for several hours after a power failure. Two 6-volt batteries are preferred. In normal line-powered operation they supply five volts for the digital electronics, but when a 12-volt d-c output is required, as to actuate a solenoid valve, they are automatically connected in series.

The frame or base and the cover of the instrument contain novel features. Preferably of molded plastic, the frame or base has hollow radially-extending rib portions which serve to make the structure light and rigid. Other novel features will become apparant.

DESCRIPTION OF RELATED ART

It is known to digitize the analog electrical output of a seismometer such as the Benioff type, then process the digital data by computer in various ways such as integration and filtering. Acceleration.time histories of earthquakes have been recorded on tape as frequency-o modulated carriers for later playback and demodulation, then digitized in analog-to-digital converters for computer analysis. Real-time digitization is also practiced.

In the Drawing:

FIG. 6 is a perspective view of an acceleration sensor with its capacitive pickoff;

FIG. 7 is a perspective detail, partly cut away, of a portion of a dashpot damper;

FIG. 8 is a sectional view along line 8—8 of FIG. 6;

DETAILED DESCRIPTION

Figure 2:
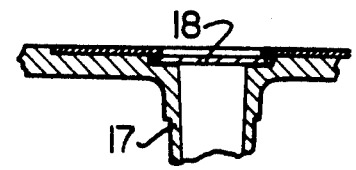
FIG. 2 is a sectional detail on line 2—2 of FIG. 1.
Figure 1:
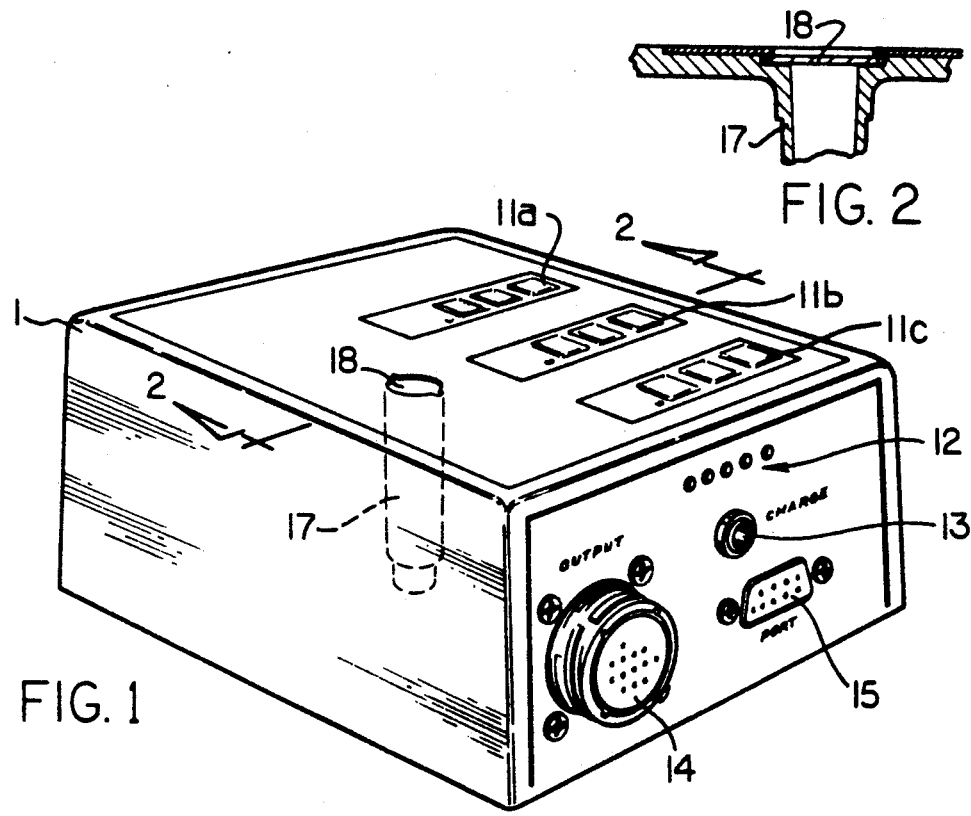
FIG. 1 is a perspective view of the cover of the instrument.
Figure 3:
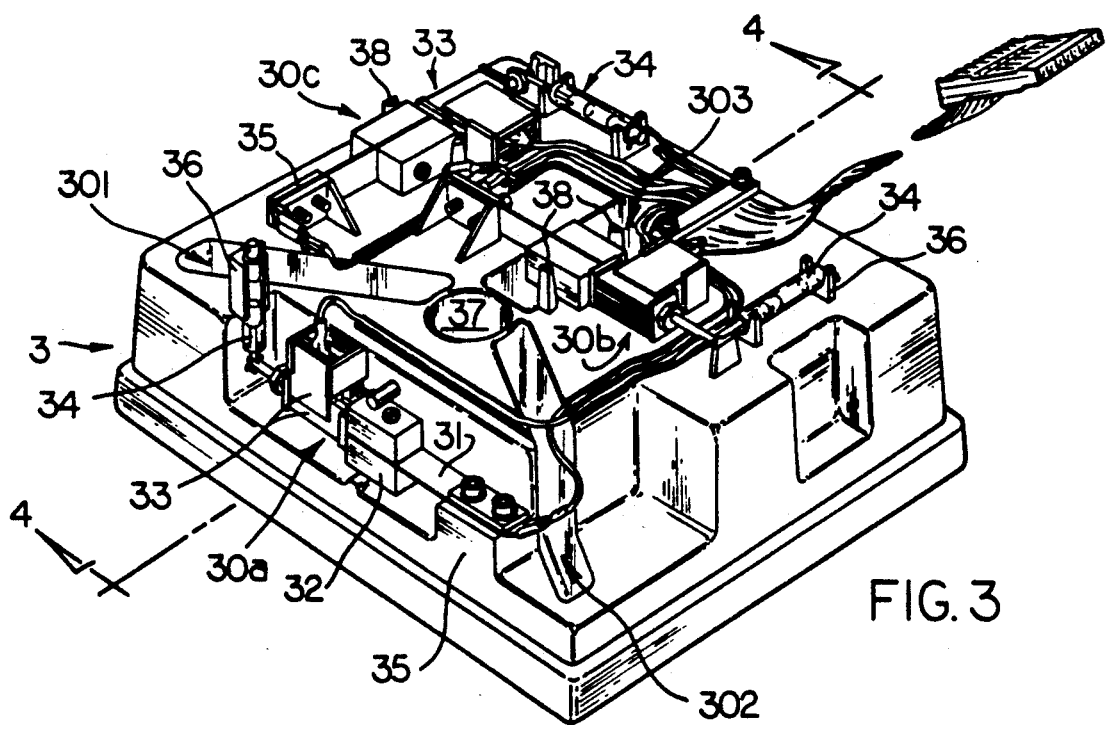
FIG. 3 is a perspective view of the base of the instrument showing the acceleration sensors.

Referring first to FIGS. 1–3, FIG. 1 shows the hollow cover 1 of an instrument of the invention, with numerical LCD or other suitable displays 11a, 11b, 11c. All the electronic components, to be described later, are mounted inside the top surface of this cover. Holes 12 are provided for access to internal control switches, and a connector 13 for external power to charge the batteries, together with connectors 14, 15 for external devices or loads such as computers, recorders, or solenoid valves.

Cover 1 has a locating pin or finger portion 17, shown dotted in FIG. 1, in the shape of a hollow tapered cylinder. This finger fits into a hollow locating receptacle portion 37 in the base 3, partly visible in FIG. 3. The two are shown engaged in the sectional view of FIG. 4. Here, screw 312 holds the instrument down. The top of hollow pin 17 may be covered as at 18, FIG. 2.

Figure 4:
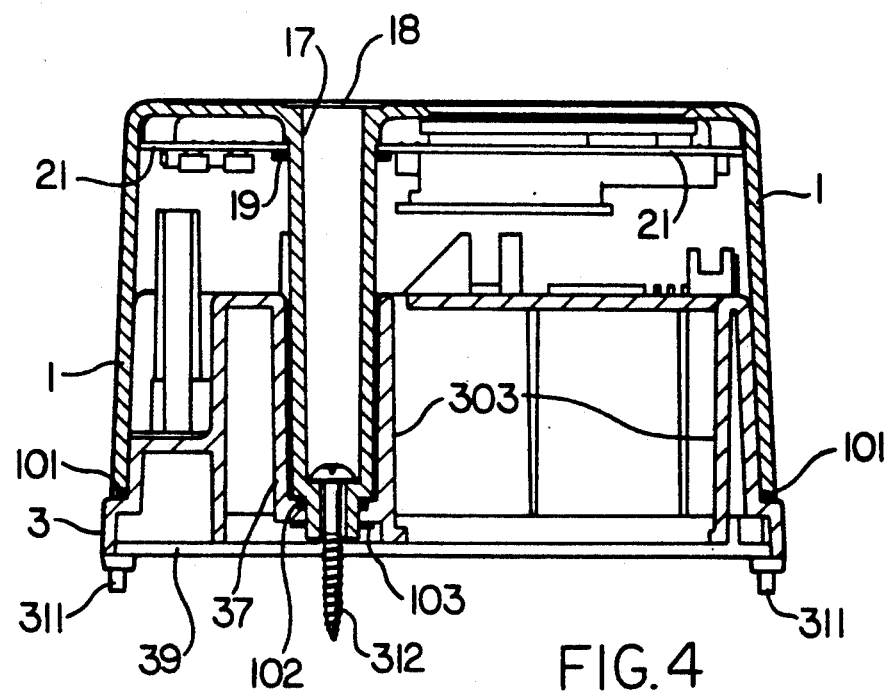
FIG. 4 is a sectional view in direction 4—4 of FIG. 3 but with the cover in place.

The electronic components are mounted conventionally on a printed circuit board indicated at 21, FIG. 4. This PC board 21 is conveniently provided with a hole that slips over pin or finger portion 17. It may then be held in place (FIG. 4) with a retaining ring 19, occupying space in the top portion of cover 1.

To seal the instrument against dust and moisture, O-rings are preferably provided as gaskets between cover 1 and frame or base 3. These are shown in section at 101 and 102 in FIG. 4 The base and cover are held together with a retaining ring 103.

Referring to FIG. 3, the base or frame 3 of the instrument is shown in perspective with the three acceleration sensors indicated generally at 30a, 30b, 30c, mounted on it so as to respond in mutually perpendicular directions. These sensors are all alike, so only 30a has its parts designated: it comprises a reed 31 of spring material, a proof mass 32, a variable capacitor pickoff 33, and an air dashpot damper 34. A single sensor is shown in more detail in FIGS. 6–8, described later.

Suitable mounting elements are provided as integral parts of the molded base or frame 3, as pads 35 for the clamped end of reed 31 and clips 36 to hold the dampers 34. Integral stops are provided as at 38, at limit the excursion of the proof masses.

Certain other structural elements of the base 3 are part of the invention. In FIG. 3, wide hollow rib portions 301, 302, 303 extend generally radially from locating receptacle portion 37 to points near the periphery of base 3. FIG. 3 shows their hollow inside surfaces. Their outer surfaces are shown at 301–303 in FIG. 5. These rib portions serve to stiffen the base or frame structure 3. Rib portion 303 serves in addition as the partition between two similar spaces or compartments 350, 351, FIG. 5, into which rechargeable batteries 50, 51 fit. These batteries are held in place by the base plate 39, FIG. 5, which may be fastened in place by suitable screws.

Figure 5:
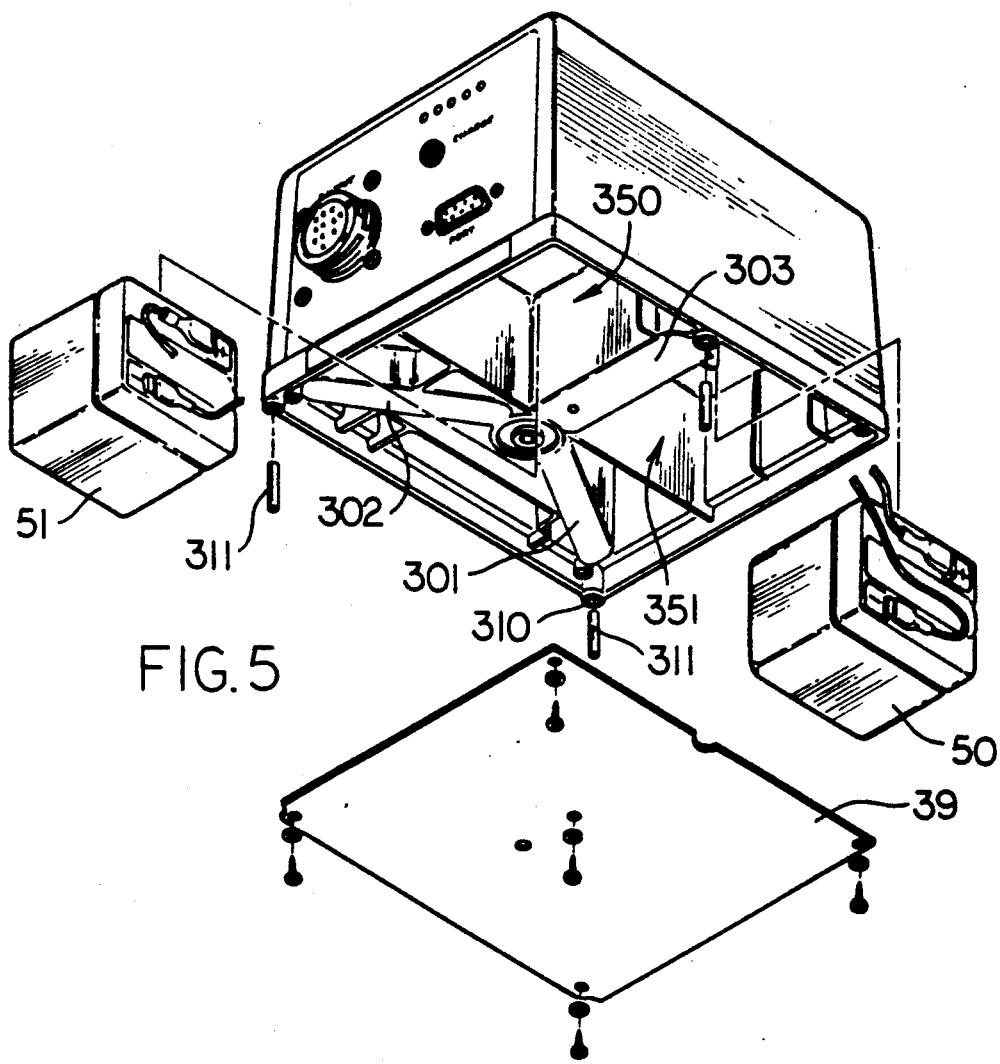
FIG. 5 is a perspective view showing the underside of the instrument.

FIGS. 4–5 also show means for mounting the instrument in place. Screw 312, FIG. 4, holds it down. For precise orientation, pins 311 are preferably provided (such as rollpins) fitting into holes 310 in base 3, FIG. 5. The rollpins can vary in length to penetrate various thicknesses of carpet. Their sharp edges dig into the mounting surface of wood or concrete to prevent rotation, with minimum screw load.

Referring now to FIG. 6, the working elements of an acceleration sensor and its variable capacitance pickoff are shown in perspective. A cantilever spring or reed 31 is fixed at one end to a suitable bracket 35. Its free end carries a proof mass or weight 32 to which is fastened a set of spaced air capacitor plates 332, herein called armature plates. Meshing with these without contact is a set of spaced stationary plates 331, herein called stator plates, which are fixed to the base or frame 3 by means not shown. The mass of elements 32 plus 332 cooperates with the compliance of reed 31 to form a mass-spring system which deflects proportionally to the acceleration of its base (at 35).

To adjust the natural frequency of this mass-spring system adjusting nut 338 is provided, which can move the center of mass. It may be locked in place with a suitable thread-locking fluid.

Oscillations at its natural frequency, which may be of the order of 12.7 Hz, are damped by an air dashpot 34. This has a piston 341, preferably of graphite, slidable and closely-fitted in a cylinder 342 which is preferably of glass. The degree of damping, i.e., the mechanical resistance in dynes/cm/sec, is determined by air leakage; a simple precision air leak is provided by the metal plug 343 and pin 344. See detail in FIG. 7. Plug 343 is closed at its outer end and is glued in the end of the cylinder 342. A small hole 345 is drilled crossways in the plug and the pin 344 passed through it in a loose fit. Hole 345 may be about 0.5 mm in diameter and pin 344 about 0.45 mm. The 0.05 mm clearance provides the air leak.

FIG. 8 is a sectional detail of the capacitive pickoff element 331, 332. The sets of stator and armature plates 331, 332 are held spacedly together by headers 336, 337 respectively; the area of intermeshing is indicated at 338.

Signal and Data Processing

The capacitance of the capacitive pickoff 33 on each acceleration sensor 30 (FIGS. 3 and 6) is translated into the length of an electrical pulse in known manner, as by a commercial type 555 timing module. This pulse is then used to gate a high-frequency clock signal on and off. The number of clock cycles in each such pulse is then counted. This count is a measure of the pulse length, and hence a measure of the acceleration sensed.

Since the pickoff capacitances have known magnitudes at rest, i.e., zero applied acceleration (less gravity), the corresponding "zero" count is subtracted from the current count or raw count in a microprocessor. The microprocessor then sums these differences, continuously. These sums are displayed on an LCD or other suitable type of display.

Such sum is a time integral of the acceleration sensed, as from an earthquake, and this integral is a measure of the Cumulative Absolute Velocity (CAV). Engdahl Scale (ES) values are functions of CAV.

The electronic system must do several things. The subtraction of the "zero" count noted above is done on an absolute basis, i.e. without regard to which quantity is greater; a displacement x of a pickoff 33 in either direction from its "zero" position will produce the same count herein called an absolute difference. The display must show ES values above a predetermined threshold level, ignoring accelerations below that level. The system must periodically re-zero itself to avoid the accumulation of negligibly small accelerations such as those from minor earth vibration and from slight tilt of the instrument mounting. It must actuate alarms and protective devices when the ES value exceeds a predetermined level; and it should desirably store the acceleration vs. time history in a suitable memory for later retrieval and analysis. For this storage, a static random access memory (SRAM) is suitable.

Figure 9:
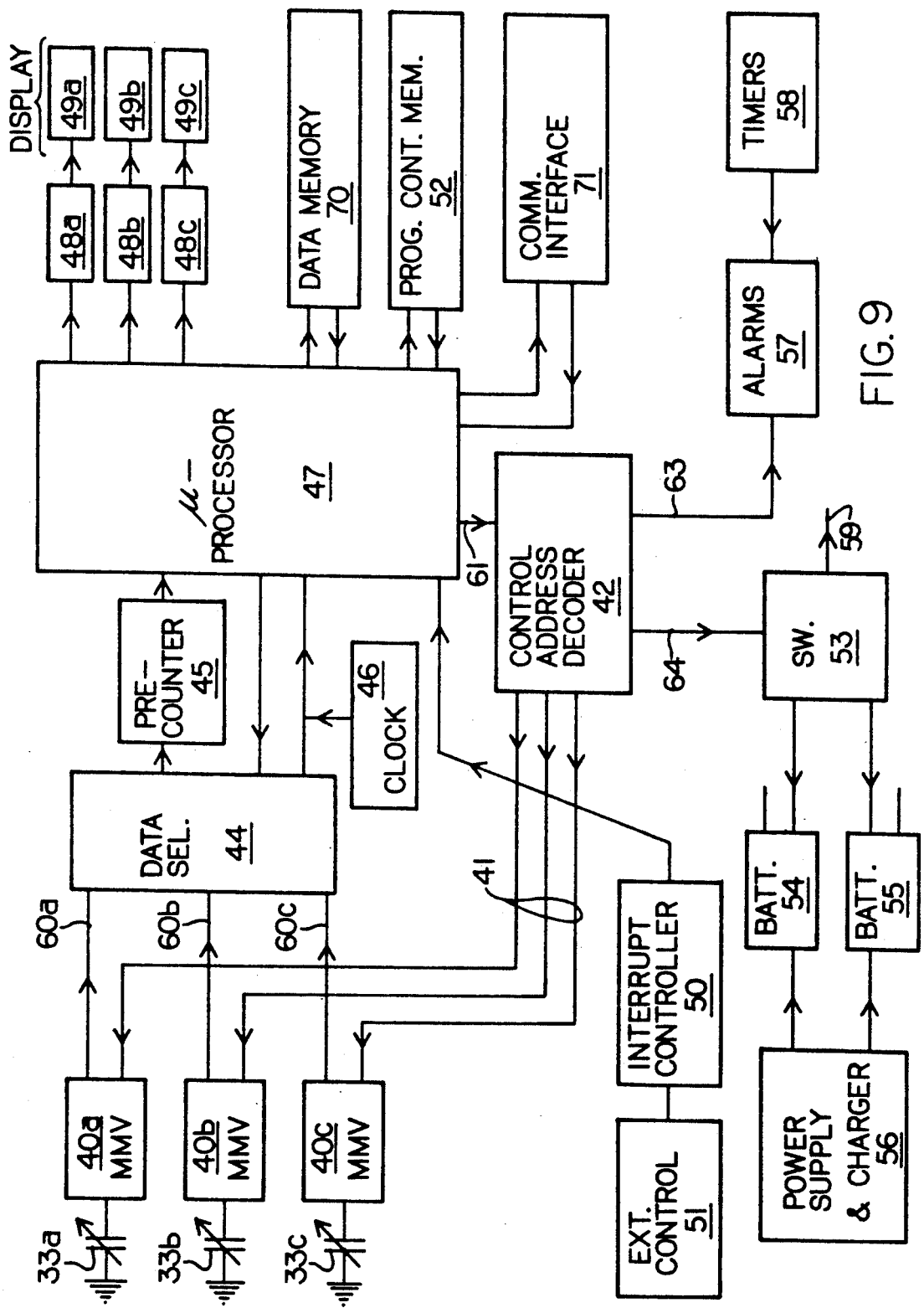
FIG. 9 is a block diagram of an electronic seismic signal and data processing system.

FIG. 9 is a simplified block diagram of an electronic system according to the invention. Substantially all the components are commercially available digital integrated circuits. They are mounted conventionally on a circuit board 21, which is preferably located inside the top of the cover 1 of the instrument, supported as at 17 and 19 in FIG. 4.

Referring again to FIG. 9, the capacitive pickoffs 33a, 33b, 33c are each connected to monostable multivibrators (MMV's) 40a, 40b, 40c so as to form the capacitive half of an ordinary R-C timing circuit, to determine the MMV pulse length. When a "START" pulse is applied to an MMV, it "flips" for a period of time determined by the product RC, then reverts to its former "standby" state. This type of circuitry is known in bench test instruments for measuring capacitors. The output pulse length in seconds is proportional to R in megohms times C in microfarads. Usually the MMV may be the common commercial type 555 timing module.

The output pulses are started by a "START" signal on a line 41, FIG. 9, which is under control of a microprocessor 47. These "START" pulses are fed sequentially to the MMV's 40a-40c in turn. The sequence is repeated preferably at about 100 per second; each MMV is thus allocated about 1/300 second for reading. Decoder 42 is also used to select displays, reset counters, and initiate alarms and the like, controlled by microprocessor 47 via lines indicated at 61, 62, and 63.

The MMV output pulses go via lines 60a-60c to block 44 labeled "Data Selector", which in practice may be a set of gates. This data selector causes clock pulses from crystal oscillator 46, preferably at around 20 megaHertz, to be sent to precounter 45 for a period equal to the length of the MMV pulse. Precounter 45 is a high speed binary counter, preferably of 8 bits, used because the preferred type of microprocessor cannot count faster than about 1 megaHertz. Since the output of precounter 45 is 256 times slower, the microprocessor has no difficulty in counting its output. Microprocessor 47 reads the precounter 45 at the end of each MMV pulse and adds that reading to the number in its internal counter.

The high clock frequency is desired because the magnitudes of the capacitances of the pickoffs 33a-33c are necessarily small, ranging around 16 to 25 picofarads. Stray capacitance adds 4 or 5 picofarads more. When charged through a 10 megohm resistor, the resulting MMV output pulses range from around 0.22 to 0.33 milliseconds long. At a 20 MHz clock frequency, the count for each MMV output pulse is then around 4400 to 6600, providing satisfactory resolution of the data.

When the accelerometers 30a-30c are in a normal resting or "zero" position their capacitive pickoffs 33a-33c are typically meshed to about half their maximum capacitances, corresponding to a "zero" clock count of perhaps 5500. A first task for the microprocessor 47 is to store this number, for comparison with later ones.

After the microprocessor 47 has determined this zero or "resting" raw count and performed the necessary subtractions, additions, and other operations, it feeds the resulting CAV or ES numbers to display drivers 48a-48c which in turn drive suitable displays 49a-49c. These display the CAV or ES values in numerals corresponding to the sums of the computed products of acceleration times time, for each of the three directions: Vertical, North-South, and East-West.

When the ES or CAV value along any of these axes exceeds a first or second predetermined level, the microprocessor 47 may, as via a line 63, actuate suitable alarms 57 which may sound intermittently under control of suitable timers 58, and simultaneously activate relays.

Power to the electronic system is normally supplied from a 6-volt battery 54 via a 5-volt regulator (not shown). An extra battery 55 is also provided. Both are kept charged (floating) by a suitable line-powered supply 56. When the CAV or ES value exceeds a third predetermined level the microprocessor may be programmed to cause switching means 53 to connect the two batteries in series and apply the resulting 12 volts to an external load as via a line 59. Such load may be a circuit breaker or a solenoid-operated valve: this operation is to effect emergency shutdown of power, gas lines, or the like.

Various instructions to the microprocessor 47 are required from the outside, such as RESET and CALIBRATE, which may originate in manual pushbuttons or the like 51, FIG. 9. These enter instructions into programmable logic arrays 50 of known type (labeled "Interrupt Controller") which are programmed to enter the appropriate instructions into the microprocessor 47. Additional memory 70 may be provided, and communications interface means 71 for remote reading or control.

The Program Control Memory 52 contains the program steps necessary for microprocessor 47 to perform its tasks and to contain such fixed data tables as may be needed, such as for linearizing accelerometer data. In the present embodiment it holds 4K 8-bit words, of which about 3K are used. This, in conjunction with microprocessor 47, may be programmed to do the following:

(a) Orderly start-up upon application of power, including measuring and storing background "zero" values of pickoff capacitances as numbers.

(b) Measure the capacitances periodically and compute the differences (if any) from the "zero" number.

(c) Discard data below a predetermined rate of change of CAV or ES level.

(d) Add the difference numbers from step (b) to get CAV or ES.

(e) Provide continuous slow zero correction.

(f) Compare the ES or CAV from (d) to a predetermined threshold value.

(g) If greater, initiate alarm and relay closures and continue to add and display. If not greater, discard data and continue to display background level.

(h) Compare accumulated CAV or ES numbers with a second predetermined level. If greater, initiate a second alarm level and relay closure. Compare to third predetermined value, and provide an electrical pulse to actuate emergency or other devices.

(i) Store maximum CAV or ES value reached during a seismic event. Retain and display until (1) a manual reset switch is actuated or (2) a succeeding seismic event results in higher values. Display these.

The initial "zero" or "resting" level may be obtained by having the microprocessor 47 make, e.g., 100 count measurements of pickoff capacitances (number of clock cycles per MMV pulse), add them, and then divide by 100 to get an average. This average "resting" count is then stored in the memory, and the differences between it and the temporarally current measurements computed and summed.

When there is no earthquake these difference numbers still cannot always add up to zero, because of background noise and small steady gravitational accelerations due to any slight tilt of the instrument mounting. The resulting difference numbers will accumulate indefinitely, leading to false off-scale data, unless they are removed at suitable, relatively long, intervals. The microprocessor 47 is programmed to perform such periodic re-zeroing by continuously performing a slow integration in the direction of zero error. (The effect is roughly like that of a high-pass filter cutting off somewhere below about 0.2 Hz). Each time a measurement is made the microprocessor 47 determines if the difference number is greater or less than the existing zero or "resting" reading or number. If it is greater, 1 count is added to L the zero or "resting" number. If it is less, 1 count is subtracted from the zero or "resting" number.

Since the sensitivity of a preferred embodiment of the invention is about 1100 counts per g (1 g=acceleration of gravity) and a preferred sampling rate is 100 per second, the zero or "resting" acceleration could shift at a maximum rate of 100/1100=0.94 g per second (which is unlikely).

Earthquake damage to wiring, piping, batteries, pressure vessels, structures, machines, and the like is found to be greatest at ground motion frequencies below 4 Hz. Hence, when the computed data exceeds ES1, it is also routed through a rolling average digital filter to provide a rolloff above 4 Hz, i.e., to attenuate frequencies above 4 Hz. These data may be summed or accumulated until ES35 is exceeded. At this point the microprocessor 47 causes the decoder 42 to activate line 64 to switching means 53 to energize line 59 to effect shutoff of gas valves, electric power, or other desired equiment. At this point the displays 49a–49c may show higher ES values because their input includes accelerations at frequencies higher than 4 Hz.

The microprocessor 47 continuously stores acceleration data for each axis in its 32K memory. The data are stored starting from the lowest memory array and proceed in order toward the highest location. When about 2½ seconds of data have been recorded, the microprocessor starts over at the lowest location and replaces the old data with new. When the computed data exceeds ESl, the microprocessor marks the location of data 2.5 seconds old and then continues to record new data until 2.5 seconds after the event is over. The location of the end of the 2.5 seconds post-event data is marked and becomes the starting location for new records.

The microprocessor will continue to record data, keeping only a 2.5-second history until such time as it has been reset or a succeeding seismic event occures. The new event will be recorded as before until 2.5 seconds after it is over. It will continue this procedure until such time as it has been reset or has used up all available memory. The 2.5 second figure is based on the statistics of seismic events and the sampling rate and memory capacity chosen; it is not limiting.

If all available memory is used up the microprocessor will continue to monitor and indicate the highest ES number experienced and to alarm and provide external control signals. The result is a series of records that include 2.5 seconds of pre-event data, the event itself, and 2.5 seconds of post-event history for each occurrence. The 32K memory in this example provides a total capacity to record 109 seconds of seismic acceleration data. The data are retained until a readout occurs or the device is reset. This data storage is done so that complete 3-axis seismograms can be retrieved after 1 or more events.

In one preferred embodiment of the invention, the functional blocks of FIG. 9 are made up of commercial integrated circuits of the following type numbers, connected in known manner:

| | |
|---|---|
| Monostable Multivibrators (MMV) 40a–40c | Type 555 or 556 timer modules; |
| Control Address Decoder 42 | 2 - Type 74S188 PROM |
| Data Selector 44 | 4 - 74HC04 inverters 74HC32 or gates; |
| Precounter 45 | 1 - 74HC393; |
| Clock 46 | 20 - MHz crystal oscillator; |
| Microprocessor 47 | COP840C (National Semiconductor Co.); |
| Display Drivers 48a–48c | MM5452 |
| Interrupt Controller 50 | Programmable Logic Array GAL 16V8 |
| Program Control Memory 52 | 27C64 EPROM with: 2 - 74HC154 shift registers, 1 - 74HC373 8-bit latch, |

| |
|---|
| -continued |
| 1 - 74HC151 data selector, |
| 1 - 74HC1 4-bit binary counter |

In a typical acceleration sensor such as shown in FIG. 6, the proof mass 32 may weigh about 22 grams, deflecting about 2 mm at 1 g acceleration, the natural frequency being around 12.7 Hz.

The following publications illustrate the engineering application of these components in the present invention:

(a) Conversion of capacitance to pulse length and conversion of pulse length to a numerical count: "Radio-Electronics" magazine, July 1989, p. 38–43 (Gernsback Publications, Farmingdale, N.Y. 11735).

(b) Pre-counters: "CMOS Logic Databook", 1988, p. 3-291 to 3-295, re type 54HC390-393 counters. National Semiconductor Corp., Santa Clara, Calif. 95052-8090.

(c) Data subtracting, storing, comparing, and summing: "Microcontrollers Databook", 1988, National Semiconductor Corp., p. 2-7 to 2-26, re microcontroller (microprocessor) types COP840C et al. The microprocessor above was programmed to perform the functions described by using the data on pages 2-20 through 2-25 therein.

I claim:

1. A seismometer system comprising:
A seismic acceleration sensor having a frame, and a proof mass disposed to execute a mechanical displacement with respect to said frame in response to acceleration of said frame;
a variable capacitor connected mechanically between said mass and said frame, its capacitance varying with said displacement;
an electronic timer connected to said capacitor means and disposed to generate an electrical pulse whose length in time is a function of said capacitance;
a clock oscillator means generating clock cycles at a predetermined frequency;
a gate means connected to said timer and disposed to deliver a string of said clock cycles during the length of said pulse; and
a counter making a raw count of the number of said clockcycles in said string,
the said count being a measure of said acceleration.

2. The combination of claim 1, wherein
said timer is a monostable multivibrator having a "start" terminal, a "start" signal applied thereto initiating a said electric pulse; and further comprising:
start-signal generating means generating repetitive "start" signals initiating repetitive pulses,
the said number of clock cycles in each said repetitive pulse being counted by said counter to produce said raw counts.

3. The combination of claim 2 wherein
said capacitance and raw count have a resting count value at zero acceleration,
said raw count increasing therefrom at acceleration in one direction and decreasing therefrom at accelerations in the opposite direction; and further comprising
computer means taking the absolute difference between each said raw count and said resting count, said absolute difference being a corrected count substantially proportional to said acceleration.

4. The combination of claim 3, further comprising memory means storing said corrected counts, and processing means adding said corrected counts successively to a sum, said sum being a measure of the time integral of said acceleration, said time integral being a cumulative absolute velocity.

5. The combination of claim 4, further comprising:

computing means periodically taking an average of said resint counts, subtracting the said temporally current corrected count, and adding or subtracting the difference in the direction of zero error, to produce periodic re-zeroing of said resting counts.

6. The combination of claim 4 further comprising means discarding those of said corrected counts which lie below a predetermined value.

7. The combination of claim 6 further comprising display means displaying and retaining the numerical value of said sum.

8. The combination of claim 7 further comprising means to initiate alarms and relay closures when predetermined values of said sum are exceeded.

9. The combination of claim 8 further comprising shutdown initiation means with switching means providing an electrical shutdown pulse to an electrical terminal when a predetermined value of said sum is exceeded.

10. The combination of claim 9 further comprising two batteries, each providing sufficient voltage to power said systems, and wherein said switching means connects said batteries in series to provide substantially twice said voltage in said shutdown pulse.

11. The combination of claim 6, further comprising means to retrieve from said memory means a series of said corrected counts, said series being a record of a seismogram.

12. A system as in claim 1 wherein said acceleration sensors are three in number and oriented in mutually perpendicular directions, each connected to its individual said timer, said gate means gating clock pulses serially to said timers in order.

13. The structure of claim 1 wherein said frame is hollow and box-like and has a locating hole extending vertically through its central portion, and at least three rib-like portions extending generally radially from adjacent said hole, to stiffen said frame.

14. The structure of claim 13, further comprising a cover fitting over said frame and having a locating finger portion fitting into said locating hole.

15. The structure of claim 13 further comprising holes in the bottom portion of said frame and pins fitting in said holes to secure the mounting of said frame.

16. The structure of claim 1 wherein said sensor is damped by an air dashpot connected mechanically between said proof mass and said frame, said dashpot comprising a piston, a cylinder, and an adjustable air leak in said cylinder, said air leak comprising a cap on said cylinder, a transverse hole in said cap, and an air leak control pin fitting loosely in said hole, the magnitude of said air leak being adjusted by selecting the diameter of said pin.

17. A system as in claim 1, wherein said clock means is a single oscillator, and comprising operative timing connections from said oscillator to both said gate means and to said counter.

* * * * *